Patented Sept. 7, 1948

2,448,585

UNITED STATES PATENT OFFICE 2,448,585

ORGANIC PEROXIDE-CURABLE AND ORGANIC PEROXIDE-CURED SYNTHETIC POLYESTER RUBBERS

Calvin S. Fuller, Chatham, N. J., assignor to Bell Telephone Laboratories, Incorporated, New York, N. Y., a corporation of New York No Drawing. Application April 30, 1943, Serial No. 485,202

3 Claims. (Cl. 260—75)

This invention relates to cured synthetic rubbers and to substances capable of being cured to synthetic rubbers. This application is in part a continuation of the application of C. S. Fuller, Serial No. 401,956, filed July 11, 1941, now abandoned.

The cured synthetic rubbers of the present invention are prepared by cross-linking polyesters of high molecular weight which possess insufficient crystallinity to render them brittle and particularly those which are essentially non-crystalline, plastic gums at room temperatures. This curing is accomplished by intimately mixing the polyester with a substance which is capable of generating free radicals having a cross-linking activity and heating the mixture to decompose the free radical generating substance and cause cross-linking. Benzoyl peroxide is a typical and outstanding example of such a free radical generating substance.

These polyesters may be strictly linear polyesters of high molecular weight containing no non-benzenoid carbon-to-carbon unsaturation, which are prepared by the superesterification of a glycol with a dicarboxylic acid of a hydroxy acid with itself, in a manner similar for instance, to that described for crystalline polyesters in U. S. Patents 2,071,250 and 2,249,950. Polyesters, which are essentially similar but which contain limited amounts of olefinic or non-benzenoid unsaturation, may also be cured to form valuable synthetic rubbers. These partially unsaturated polyesters may be prepared in the same manner as the fully saturated polyesters, except that one or more of the ingredients of the reaction mixture from which they are prepared contains a properly limited amount of unsaturated carbon-to-carbon bonds.

The polyester gums, the preparation of which will be described in more detail below, are extremely viscous liquids, which at room temperature have a consistency somewhat similar to that of milled crepe rubber, or else they are somewhat flexible, rubbery solids of slight crystallinity which melt readily at temperatures up to about 20° C. above room temperature to form viscous liquids of a consistency similar to the normally liquid polyesters. These latter substances possess sufficient flexibility, being largely amorphous, to be milled directly on cold rolls, where they are almost instantly reduced to a viscous liquid state by the temperature rise induced by milling.

These polyesters, both liquid and solid, are prepared for vulcanization by milling the polyesters, preferably on cool rolls, with a curing agent, such as benzoyl peroxide, preferably in the form of a finely divided powder. Milling is facilitated by the exceptionally good building tack of the polyesters, which is considerably better than that of other synthetic rubbers and approaches that of natural rubber. Other compounding ingredients, particularly reinforcing pigments, may also be milled with the polyester. The compounded polyester is then heated in a mold to a temperature sufficient to cross-link the polyester. Since curing is practically instantaneous, the curing operation need not be continued substantially longer than the time necessary for the interior of the molded article to reach the curing temperature.

The resulting cured, pigmented rubber, when prepared from suitable polyesters and reinforcing pigments properly proportioned and when properly cured, may achieve tensile strengths as high as 3,000 pounds per square inch, or even higher, at elongations in the vicinity of 650 per cent. The cured substances have an excellent resistance to gasoline and hydrocarbon oils, being far superior to natural rubber and superior to other synthetics in this respect. They are resistant to many corrosive substances, such as sulphur, chlorine and fluorine, which rapidly deteriorate other rubber-like materials. They also have a resistance to dry heat, particularly in the absence of oxygen, which is far superior to natural rubber and other synthetic elastomers. By a proper choice of polyesters, cured substances may be obtained having brittle points at low temperatures approaching those of natural rubber. Because of the extreme plasticity of the uncured polyesters at elevated temperatures, excellent intricate moldings can be obtained. In their abrasion resistance and electrical properties, the rubbers of the present invention are adequate for most uses. Their susceptibility to hydrolysis precludes their use at high temperatures in the presence of moisture, but in most cases is not sufficient to interfere with their use under normal conditions.

Reversible elasticity and good tensile strength in the cured rubbers of the present invention are dependent upon certain properties in the uncured polyesters. Since failure of the rubber under tension occurs ordinarily from the overcoming of forces holding different molecules together, rather than from the internal splitting of the molecules, any factors tending to increase the forces between molecules will increase the tensile strength. One of the most important factors in determining the tensile strength of the cured gum itself is the degree of linear growth of the molecules of the polyester. With the strictly linear polyesters prepared from glycols and dicarboxylic acids containing no non-benzenoid unsaturation or from monohydroxy monocarboxylic acids containing no non-benzenoid unsaturation, the degree of linear growth is measured directly by the molecular weight of the polyester, since theoretically each molecule is made up of a single long chain.

There is a relatively sharp increase in the tensile strength of the cured polyesters when the molecular weights of the polyester gums from which they are prepared achieve values in the vicinity of 8,000 to 10,000 as estimated by the Staudinger viscosity method. The useful rubbers of the present invention are prepared from polyesters having molecular weights of at least this minimum and usually from polyesters having higher molecular weights. Linear polyesters of such molecular weights ordinarily possess intrinsic viscosities in chloroform of at least 0.4.

The degree of linear growth for saturated linear polyesters may also be expressed in terms of the average number of atoms in the linear chains of the polyester molecules. To possess the requisite tensile strength the polyesters of the present invention should contain an average of at least 500 or 600 atoms in their linear chains.

Since the polyesters are prepared from the esterification of only bifunctional ingredients, the degree of linear growth can also be expressed in terms of the degree of esterification possessed by the polyester. The most suitable products for the present invention are produced when the polyesters possess a degree of esterification in excess of 98 per cent. Polyesters having this degree of esterification will contain at least 98 ester groups for each 100 total ester, hydroxyl and carboxyl groups in the polyester.

Although linear growth has an important effect in increasing the adhesive force between molecules and thus increasing tensile strength, other details of molecular structure also play a part in this result. One of the most important of these factors is the degree of order in the molecular chains of the polyester. Thus polyesters in which the polar groups are regularly spaced ordinarily have a higher tensile strength than those which have a more random spacing. Thus polyesters produced from a single hydroxy acid have regularly spaced polar groups and have a higher tensile strength than those produced from a single glycol and a single dicarboxylic acid of different chain length. If more than one glycol or more than one dicarboxylic acid is employed for producing the polyester, the degree of order becomes lower and the tensile strength becomes less. However, since the hydroxy acids are not available commercially, the polyesters produced from glycols and dicarboxylic acids are considerably more important technically. It is desirable, however, from the standpoint of tensile strength, to limit as far as possible the total number of glycols and dicarboxylic acids going into a single polyester.

It has also been found that polyesters containing no non-benzenoid unsaturation give cured products having higher tensile strengths than those containing such unsaturation. This effect of unsaturation is aggravated by the fact that unsaturation is most easily introduced into the polyester by the substitution of an unsaturated dicarboxylic acid for a portion of the saturated acid, thus causing a lower degree of order in the molecular chain and a lower tensile strength.

Although the fully saturated polyesters are therefore more desirable from the standpoint of tensile strength, a considerably greater amount of curing agent is required for their vulcanization than for the vulcanization of polyesters containing unsaturation. The necessity for a greater amount of curing agent increases the cost of the cured product and causes larger amounts of undesirable by-products to be left in the cured product. The presence of these by-products ordinarily shortens the life of the rubber. Therefore, the partially unsaturated polyesters will often be found more desirable technically.

As indicated above, the most convenient method of introducing unsaturation into the polyester is by employing an unsaturated dicarboxylic acid as part of the esterification mixture, since these substances, particularly maleic and fumaric acids, are available commercially, whereas unsaturated glycols or hydroxy acids are more difficult to obtain. Among the other more available unsaturated acids which may be used are itaconic, mesaconic, muconic and dihydromuconic acids.

In order to produce the necessary high degree of esterification or condensation indicated above as required for the proper linear growth, the reactants from which the polyesters are produced must be subjected to a prolonged heating operation under conditions such as to remove the reaction by-products continuously and effectively. The reaction by-products are most effectively removed by bubbling an inert gas such as dry, oxygen-free hydrogen through the reaction mixture until the esterification or condensation has proceeded to the desired degree of completion, with or without the application of reduced pressure. The reaction by-products may also be removed by other means, such as by the use of a molecular still or by stirring the reaction mixture continuously into a foam under reduced pressure. Unless some such method is employed, the high degree of condensation necessary for the production of rubber-like polymers of good tensile strength can not be obtained within a reasonable time.

When olefinic bonds are present in the reaction mixture, double bond polymerization occurs simultaneously with the condensation reaction responsible for linear growth. If too great a number of such double bonds is present, the polymerization reaction will proceed at such a rate simultaneously with the esterification reaction that the viscosity of the mixture will increase excessively to a point where the product is no longer capable of permanent distortion and is no longer liquid. If this excessive cross-linking reaction occurs before the mixture has been esterified to the required degree, it will be impossible to secure a plastic product capable of being compounded and vulcanized to a synthetic rubber of the desired high tensile strength. Moreover, with too high a degree of unsaturation in the polyester, the cured products have undesirably low elongations.

In general, it may be stated that the amount of any substance in the reaction mixture containing olefinic bonds should be so limited that the number of bonds is less than about 5 per 400 atoms in the linear chain of the theoretical resulting polyester and preferably less than about 2 such bonds per 400 atoms in the linear chain. This limitation is based upon the average theoretical molecule produced, assuming that all the unsaturated bonds in the initial reactants remain as unsaturated bonds in the polyester which is produced and that no cross-linking occurs.

When a dicarboxylic acid containing conjugated unsaturated bonds, such as maleic acid, is used for forming the unsaturated polyesters of the present invention, this limitation of the unsaturation in the resulting polyester may be accomplished by diluting the unsaturated acid with a dicarboxylic acid containing no unsaturated bonds, such as succinic acid or sebacic acid, and esterifying the resulting mixture with glycol. In general, in such a mixture the maleic acid should not exceed 10 per cent by weight of the mixture of acids and is preferably in the vicinity of about 5 per cent by weight or less. Where it is desired to take advantage of the property of curing with a substantially smaller amount of curing agent, the maleic acid should constitute at least 1 per cent of the total dicarboxylic acids employed.

In view of this tendency of esterification mixtures containing unsaturated bonds to become set due to prolonged heating before the desired degree of linear growth is obtained, it is desirable to use an esterification technique which will consistently require a minimum of time. When the polyester is formed from glycols and dicarboxylic acids, this can be accomplished by employing a large excess of glycol in the initial reaction mixture, preferably between about 5 per cent excess and about 50 per cent excess, and carrying out the initial esterification reaction in a vessel equipped with a reflux condenser which is maintained at a temperature sufficient to permit the escape of water vapor while returning the greater part of the vaporized glycol to the reaction mixture. The esterification reaction is conducted at a temperature between about 180° C. and about 220° C. and preferably in the vicinity of about 200° C. The large excess of glycol which is retained in the reaction mixture pushes the esterification reaction rapidly to completion leading to the formation of a relatively low molecular weight polyester, substantially all the molecules of which have hydroxyl groups at both ends.

Further linear growth can then proceed only through an elimination of glycols from the ends of the polyester molecules. This is accomplished by continuing the heating, without reflux, under a reduced pressure of the order of a few millimeters of mercury, while bubbling dry, oxygen-free hydrogen through the polyester. Glycol is rapidly eliminated and the molecular weight soon achieves the desired value. Although of particular advantage in the preparation of polyesters containing unsaturation, this technique is obviously also of advantage when applied to fully saturated reaction mixtures. This procedure is more particularly described and claimed in the copending application of J. B. Howard, Serial No. 492,155, filed June 24, 1943, now United States Patent 2,410,073 issued October 29, 1946.

As indicated above, when polyesters are formed from reactants at least one of which contains non-benzenoid unsaturation, a partial cross-linking reaction takes place simultaneously with the esterification reaction. If this cross-linking is prevented from becoming excessive through limitation of the amount of unsaturation initially present and through control of the reaction conditions, linear growths comparable to those obtained with fully saturated linear polyesters may be produced. Because of the complexity of the molecular structure, definition of the degree of linear growth is much more difficult for these unsaturated polyesters than for the strictly linear molecules.

It appears that the unsaturated polyester molecule is made up of essentially linear molecule chains which are produced by esterification and that these linear chains are linked at various points. If the reaction mixture is allowed to undergo a degree of esterification, or of condensation by ester interchange, equal to that of a saturated reaction mixture, the resulting polyester will possess essentially the same degree of linear growth. Therefore the most convenient means for defining the minimum degree of linearity for partially unsaturated polyester gums, is to require that the average polyester molecule contain at least 98 ester groups per 100 total ester, hydroxyl and carboxyl groups or that the polyester have a degree of esterification of at least 98 per cent.

When polyesters are produced from reaction mixtures containing more than 10 mol per cent of an unsaturated dicarboxylic acid (or more than about 5 unsaturated bonds per 400 atoms in the linear chain) and up to about 25 mol per cent unsaturated acid, a degree of esterification may be achieved without gelation which, when the polyester is cured, will yield moderate tensile strengths. However, due to the large amount of unsaturation present, the curing of such polyesters by the process described above is extremely sensitive and critical, making it very difficult, and usually impossible, to prevent overcuring to an extent which produces substances of very low elongations more closely resembling, in their physical properties, linoleums than rubbers.

Polyesters of these high molecular weights will produce cured rubbers having good reversible elasticity only if the polyesters are capable of flow at room temperature or at temperatures not substantially higher than about 20° C. above room temperature. Since polyesters possessing a high degree of crystallinity are essentially rigid, good rubbers can be obtained only from polyesters which are essentially non-crystalline at room temperatures. Polyesters which possess a small amount of crystallinity, sufficient substantially to destroy their property of flow under moderate stress, are nevertheless suitable for the purposes of the present invention, provided their crystallinity is not sufficient to render them hard and brittle and provided their crystalline melting point is not greater than about 20° C. above room temperature. The crystallinity of such polyesters is reduced by the process of vulcanization so that in many cases they may behave, at room temperatures, not substantially different from the cured polyesters which were originally viscous liquids. Even when the crystallinity remaining after vulcanization is sufficient to render the products boardy at room temperature or below, these substances are not brittle since the heat generated by distortion under stress is sufficient to reduce or destroy the crystallinity rapidly and thus produce true rubberlike behavior very shortly after the application of the stress. These partially crystalline polyesters possess an advantage over the viscous liquid polyesters in that, prior to curing, they may be stored or shipped without adhering to their containers.

In producing such non-crystalline polyesters or polyesters of limited crystallinity, advantage is taken of the fact that certain ingredients lead to polyesters which are incapable of crystallization or which have crystalline melting points below room temperatures or which crystallize so slowly that for practical purposes they may be considered permanently non-crystalline.

Polyesters derived by the esterification of polymethylene glycols with polymethylene dicarboxylic acids or by the esterification of polymethylene monohydroxy monocarboxylic acids are, with the exception of those produced from trimethylene glycol and glutaric acid, the most highly crystalline polyesters which have been produced. As the molecular structure departs from this straight chain polymethylene arrangement, as for instance by the introduction of side chain substituents, hetero-atoms or unsaturated carbon-to-carbon bonds, the polyesters become less crystalline. The presence of aromatic rings also in general reduces the crystallinity.

Therefore, polyesters prepared by reacting glycols with dicarboxylic acids, where either one of the constituents has frequently occurring or large side chains, or contains large amounts of non-benzenoid unsaturation or aromatic rings or hetero-atoms in the linear chain, are usually non-crystalline. However, if the other member of the reaction mixture is a polymethylene glycol or a polymethylene dicarboxylic acid the crystallizing tendencies of the polyester increase as the length of the polymethylene chain increases. Thus dihydromuconic acid forms a non-crystalline polyester with ethylene glycol but a crystalline polyester with decamethylene glycol. Diethylene glycol forms a non-crystalline polyester with succinic acid but a crystalline polyester with sebacic acid.

Among the alkyl substituted polymethylene glycols, the most available is isopropylene glycol of methylethylene glycol. This glycol forms non-crystalline polyesters with polymethylene dicarboxylic acids between succinic acid and sebacic acid. Polyisopropylene succinate does not become excessively crystalline when as much as 50 or 60 per cent of the isopropylene glycol is replaced by ethylene glycol. With isopropylene sebacate, however, no more than about 30 per cent of ethylene glycol can be substituted for the isopropylene glycol without inducing excessive crystallization.

Although dicarboxylic acids containing conjugated unsaturation, such as maleic or fumaric acid, form non-crystalline polyesters with the common polymethylene glycols, they are used in such small concentrations in the polyesters of the present invention that their effect upon the crystallinity is not great.

The most readily available of the non-crystalline polyester forming reactants containing hetero-atoms are diethylene glycol and diisopropylene gylcol. Diglycolic acid is also of some interest as a hetero-atom containing compound.

The most available of the aromatic ring containing reactants is phthalic acid.

Trimethylene glycol and glutaric acid, both of which contain three methylene groups between their functional end groups, form polyesters, with the shorter chain polymethylene glycol and polymethylene dicarboxylic acids, which crystallize exceedingly slowly and are therefore useful for forming certain of the cured synthetic rubbers of the present invention.

Another factor influencing crystallinity, aside from the molecular structure of the individual constituents, is the degree of order in the polyester molecules. The most ordered molecules having the most regular polar group spacing, all other factors being equivalent, are the most crystalline. Thus, the greater the number of glycols and the greater the number of dicarboxylic acids or the greater the number of hydroxy acids used in preparing the polyester, the less will be the tendency to crystallize. In a polyester prepared from etheylene glycol and equimolar amounts of sebacic and succinic acids, or similar polyesters in which maleic acid is substituted for portions of the succinic acid, the disorder imparts sufficient non-crystallinity to permit the polyester to be used for the purposes of the present invention.

Even though a polyester is non-crystalline, the utility of the cured product may be limited by its brittle point. The temperature below which the cured rubber becomes brittle is closely associated with the temperature at which the viscosity of the polyester becomes so great that the material no longer flows readily under pressure but becomes instead a brittle, glassy substance. The degree to which a rubber must be capable of being cooled before becoming brittle is dependent upon the use to which it is to be put. However, substances having a brittle temperature at or above room temperature are obviously of limited utility since their rubber-like properties can be taken advantage of only at elevated temperatures.

The non-crystalline polyesters formed predominantly from polymethylene glycols and polymethylene dicarboxylic acids, and from such glycols and dicarboxylic acids having substituted alkyl side chains, form cured products which invariably have brittle points well below room temperature. However, those polyesters made from reaction mixtures in which the dicarboxylic acid is almost all phthalic acid are usually brittle glasses at room temperature and form cured products which have a brittle point considerably above room temperature. Therefore, when polyesters for the purposes of the present invention are made from phthalic acid, the phthalic acid in general should be diluted considerably with some other dicarboxylic acid, such as a polymethylene dicarboxylic acid, which will lower the brittle point.

In general, the brittle point occurs at higher temperatures as the concentration of groups having polar activity increases in the polyester. Thus, among the polymethylene glycols and dicarboxylic acids, those having the longer polymethylene chains tend to form the polyesters having the lower brittle points. Polyesters containing no aromatic rings and fewer than one ester group per 5 atoms in the linear chains will ordinarily produce cured polymers which have brittle points below $-40°$ C.

Resistance to liquid hydrocarbons, on the other hand, is greatest in those rubbers prepared from polyesters having the largest number of ester groups in the linear chains.

In general, any linear saturated polyester is suitable for the purposes of the present invention if it possesses the requisite degree of linear growth and non-crystallinity as outlined above, if it contains on the average one or more ester groups per 20 total atoms in the linear chain, or preferably at least one ester group per 12 atoms in the linear chain, or still more desirably at least one ester group per 7 atoms in the linear chain and if it is formed of divalent organic radicals, joined by ester groups, which contain no groups which would interfere with cure. The most stable polymers are formed when these divalent organic radicals are hydrocarbon radicals, but obviously these radicals may contain ether linkages, sulphur linkages, acetal linkages, ketone groups and various other structures either in the linear chain or in substituted side chains. Most commonly, however, these radicals will be made up of divalent aliphatic hydrocarbon residues, particularly polymethylene groups or alkyl substituted polymethylene groups.

The same is true of the unsaturated polyesters except that unsaturation is present in certain of the divalent organic radicals and some cross-linking at the double bonds inevitably has occurred.

The polyester gums prepared as described above are most readily cured by intimately mixing them with a small amount of benzoyl peroxide and heating them to temperature above 105° C., and preferably to a temperature of about 125° C. The cross-linking activity of benzoyl peroxide appears to be due to the fact that upon decomposition it generates free radicals which, because of their hydrogen deficiency, remove the active hydrogen atoms on the carbon atoms adjacent to the ester groups of the polyesters, thus causing cross-linking between these carbon atoms at the free valences. Although benzoyl peroxide has been found the most effective cross-linking agent, other acyl peroxides, such as lauryl peroxide, have also been found particularly effective. Certain other organic peroxides, such as certain of the ether peroxides, ketone peroxides, olefin peroxides, terpene peroxides (particularly ascaridole), peracids and hydrocarbon peroxides, are sufficiently effective to render them usable for the purposes of the present invention.

Other free radical generating substances, such as phenyl azide or certain other azides, when used in sufficient quantity also exert a useful cross-linking action.

In each case the free radical generating subtance is intimately mixed with the polyester, as by milling, and the mixture is then cured under pressure in a mold at a curing temperature. The curing agent may be incorporated as a finely divided solid or in the form of a solution. When benzoyl peroxide is used, it may be in the form of finely divided calcium sulphate having precipitated thereon about 20 per cent of benzoyl peroxide.

The amount of curing agent required to give maximum tensile strength varies with the composition of the polyester, being affected both by the nature of the saturated components and by the amount of unsaturation. When a given polyester gum is cured with increasing amounts of benzoyl peroxide, the tensile strength rises very sharply, passes through a peak and decreases slowly. With saturated polyesters this peak is quite broad, the optimum amounts being from 3 per cent to 6 per cent for sebacates and from 5 per cent to 8 per cent for succinates. As the amount of unsaturation increases, the peak becomes much sharper and the actual amount of peroxide required for cure becomes much less. Thus for a sebacate polyester in which 4 mol per cent of the sebacic acid is replaced by maleic acid, the optimum amount of peroxide is from 0.5 per cent to 1 per cent; for a corresponding succinate-maleate, the optimum amount is from 1 per cent to 2 per cent. As the amount of maleic acid approaches about 10 mol per cent, the amount of peroxide required becomes still less and the peak becomes very critical.

The polyester, prior to curing, will ordinarily be mixed with a reinforcing pigment. The nature of the pigment employed has an important effect upon the tensile strength of the product. Two pigments have been found outstanding in producing cured products of high tensile strength. One of these is a red oxide of iron having spheroidal particles of an average size of the order of 60 millimicrons, sold under the trade name of "Mapico 297." The other pigment is a superfine precipitated calcium carbonate having an average particle size of the order of 30 millimicrons, sold under the trade name of "Kalvan." The reinforcing carbon blacks are not desirable as pigments since they impede the curing action, making it necessary to employ large amounts of benzoyl peroxide or excessively high curing temperatures, in order to secure effective curing.

The optimum tensile strengths are obtained with "Mapico 297" when the pigment is present in amounts between about 100 per cent and 150 per cent by weight of the polyester. The optimum percentage of "Kalvan" is in the vicinity of about 50 per cent by weight.

Other finely divided mineral fillers, of neither strongly acid nor strongly alkaline nature, such as aluminum oxide, talc, antimony oxide, titanium oxide or the various clays, may be employed either alone or in mixture with "Kalvan" or "Mapico 297."

The following specific examples will illustrate manners in which the present invention may be practiced:

*Example 1*

A mixture containing 44.5 mol per cent distilled sebacic acid, 44.5 mol per cent isopropylene glycol and 11 mol per cent ethylene glycol (25 per cent excess glycols) together with a small amount of zinc chloride as a catalyst were placed in a closed glass reaction vessel maintained at 200° C. and a slow stream of dry, oxygen-free hydrogen was bubbled continuously through the molten mixture. A packed reflux column maintained at 110° C. was attached to the reaction vessel. After about five hours no more water was evolved, indicating that substantially complete esterification had occurred. The reflux column was then removed and the pressure in the system was reduced to about six millimeters of mercury, the temperature being maintained at about 200° C. and the bubbling of hydrogen being continued. Glycol distilled over rapidly and after about fifteen minutes an increase in the viscosity of the product was apparent. At the end of about eight hours the product was removed and found to be an exceedingly viscous transparent liquid which crystallized slowly at room temperature to a tough, flexible, rubbery, translucent solid. A portion of this solid substance was quickly reduced to its viscous liquid state by milling on cold rolls. About 3 per cent of finely divided benzoyl peroxide was then thoroughly milled into the gum. Seventy-five per cent by weight of "Kalvan" was then added to the gum on the rolls and the milling was continued until the pigment was well dispersed. This mixture was then cured under pressure for ten minutes in a mold heated to 125° C. The resulting product had a tensile strength of 3200 pounds per square inch at an elongation of 650 per cent. The brittle point of the product was below −50° C.

*Example 2*

A polyester was prepared as described in Example 1 except that maleic acid replaced sebacic acid to the extent of 4 mol per cent of the sebacic acid which was present. The resulting polyester was milled with 0.75 per cent benzoyl peroxide and 150 per cent by weight of "Mapico 297" and was cured at 125° C. The cured product had a tensile strength of 2600 pounds per square inch and a brittle point in the vicinity of —50° C.

*Example 3*

A polyester was prepared as in Example 1 except that the dicarboxylic acid mixture was made up of 97 mol per cent of succinic acid and 3 mol per cent maleic acid and the glycol mixture was made up of 50 mol per cent isopropylene glycol and 50 mol per cent ethylene glycol, 25 per cent excess glycol being used. The polyester was pigmented with 150 per cent by weight of "Mapico 297" and cured with 2 per cent benzoyl peroxide. The cured product had a tensile strength of about 2700 pounds per square inch at an elongation of 520 per cent.

*Example 4*

A polyester was prepared as described in Example 1 by reacting 97 mol per cent sebacic acid and 3 mol per cent maleic acid with a 25 per cent excess of isopropylene glycol. The product was a permanent viscous liquid at room temperature. The polyester, pigmented with 150 per cent "Mapico 297" and cured with 1 per cent benzoyl peroxide, had a high tensile strength and a brittle point below —50° C.

*Example 5*

A polyester was prepared as described in Example 1 using a dicarboxylic acid mixture containing 30 mol per cent phthalic acid, 67 mol per cent sebacic acid and 3 mol per cent maleic acid and a 25 per cent excess of a glycol mixture containing 50 mol per cent ethylene glycol and 50 mol per cent isopropylene glycol. The resulting polyester, pigmented with 100 per cent by weight of "Mapico 297" and 1 per cent benzoyl peroxide, possessed a good tensile strength and reversible elasticity.

*Example 6*

0.95 mol of succinic acid, 0.05 mol of maleic acid and 1.05 mols of trimethylene glycol were reacted in an enclosed glass vessel at a temperature of about 200° C., while bubbling continuously a stream of dry, oxygen-free hydrogen through the reaction mixture for about 9 hours. After a large portion of the water of reaction together with a portion of the free glycol had been removed from the reaction mixture by this procedure, the substances remaining in the reaction mixture were of sufficiently high molecular weight to permit subsequent heating in a vacuum without excessive volatilization. The vessel and its contents were then subjected to evacuation while allowing sufficient hydrogen to enter the system through a needle valve to agitate the reactant while still maintaining an absolute pressure of about 0.5 centimeter of mercury. The reaction was allowed to proceed under reduced pressure until a degree of esterification in excess of 98 per cent of theoretically complete esterification was reached. This degree of esterification was reached by continuous heating for eight or more hours. After the desired degree of esterification had been obtained, atmospheric pressure was reestablished by the admission of hydrogen, and 0.05 per cent by weight of beta-napthol was added to retard subsequent oxidation of the reaction mixture upon exposure to air. The molten reaction product was then poured from the vessel and allowed to cool. The resultant product was a highly viscous, amorphous mass. The product was kneaded with a chloroform solution of benzoyl peroxide containing 2 per cent of benzoyl peroxide based on the weight of the polyester and was subsequently cured in the manner described above. A rubber-like product was obtained which had a relatively high reversible elasticity and tensile strength.

*Example 7*

A reaction similar to that described in Example 6 was carried out using 0.5 mol of sebacic acid, 0.2 mol of succinic acid, 0.2 mol of adipic acid, 0.1 mol of fumaric acid and 1.05 mols of diethylene glycol. A similar rubber-like product was obtained upon curing.

*Example 8*

A reaction similar to that described in Example 6 was carried out using 0.95 mol of succinic acid, 0.05 mol of maleic acid and 1.05 mols of diethylene glycol. This product when cured showed inappreciable swelling in toluene after three hours immersion, whereas soft vulcanized natural rubber in this time swells several hundred per cent. The brittle point of the product was —35° C.

*Example 9*

One hundred grams of the polyester produced in Example 3 were mixed on the rolls with 2 grams lauryl peroxide and then cured in a mold for five minutes at 130° C. The product was a transparent, flexible rubbery sheet.

*Example 10*

One hundred grams of the polyester produced in Example 3 were mixed on the rolls with 50 grams of Micronex carbon black and 6 grams tertiary butyl hydroperoxide and cured in a mold for one hour at 170° C. The product was a very tough sheet of high modulus having a tensile strength of about 1800 pounds per square inch.

*Example 11*

Four grams of the polyester produced in Example 3 were intimately mixed with 0.2 gram of phenyl azide and heated for four minutes at about 135° C. A rubber-like mass was obtained having good reversible elasticity.

The properties of the cured polyesters of the present invention may be modified by the addition of any of the compatible rubber compounding ingredients, such as softeners, plasticizers, pigments, bitumens, paraffin waxes and similar materials. The uncured polyesters, particularly those containing olefinic unsaturation, may be mixed with various cellulose derivatives, such as cellulose acetate or cellulose acetate butyrate, in any amounts and then may be subsequently cured. Although these substances are not always permanently compatible before curing, they remain permanently interdispersed after curing. When the cellulose derivatives are present in substantial amounts, the products are not rubber-like, the polyesters merely acting as plasticizers and tougheners for the cellulose derivatives. In a similar manner the uncured polyesters, particularly those containing olefinic unsaturation, may be mixed in varying proportion with other synthetic resins, such as the methacrylate resins, polyvinyl acetate, polyvinyl acetate-vinyl chloride, or polystyrene and may then be cured.

The rubber-like substances of the present invention have a very wide application. They may be used in sheet form for gaskets, printers' blankets, or similar articles or they may be molded as thermosetting molding materials. Alternatively, uncured polyesters may be dissolved in suitable solvents together with vulcanizing agents and the resulting solution may be employed to impregnate or coat cloth or other materials for forming oilcloth, raincoats, or similar articles. The uncured polyesters may also be employed as thermosetting adhesives when mixed with benzoyl peroxide. These materials may also be used as insulation on electrical conductors in any manner in which rubber has been employed. For this purpose the uncured polyester, mixed with curing agents and suitable fillers and modifying ingredients may be extruded continuously on wire and continuously cured. Other uses will be obvious from the description above.

Although the invention has been described in terms of its specific embodiments, certain modifications and equivalents will be apparent to those skilled in the art and are intended to be included within the scope of the invention, which is to be limited only by the reasonable scope of the appended claims.

What is claimed is:

1. A cured synthetic rubber comprising a product obtained by heating to a temperature above about 105° C., with a small amount of benzoyl peroxide, a fusible ethylene glycol-isopropylene glycol-sebacic acid-maleic acid polyester the ingredients of said polyester entering into the polyester in the proportions of about 20 mol per cent of ethylene glycol, about 80 mol per cent of isopropylene glycol, about 97 mol per cent of sebacic acid and about 3 mol per cent of maleic acid, the ester chains of said polyester having two ends, the number of ester groups in said polyester constituting at least 98 per cent of the total number of ester, hydroxyl and carboxyl groups.

2. A cured synthetic rubber comprising a product obtained by heating to a temperature above about 105° C., with a small amount of benzoyl peroxide, a fusible polyester prepared by the esterification of a reaction mixture consisting of a dihydroxy straight chain alkane and isopropylene glycol, the isopropylene glycol constituting at least 80 per cent of the glycol mixture, together with a mixture of dicarboxylic acids consisting of sebacic acid and maleic acid, the sebacic acid constituting at least 95 mol per cent of the acid mixture, the number of ester groups in said polyester constituting at least 98 per cent of the total number of ester, hydroxyl and carboxyl groups.

3. Polyisopropylene ethylene sebacate maleate wherein the isopropylene residue constitutes 80 mol per cent of the total isopropylene and ethylene residues and the sebacate residue constitutes 97 per cent of the total sebacate and maleate residues, and wherein the number of ester groups in the average molecule of said polyester constitutes at least 98 per cent of the total number of ester, hydroxyl and carboxyl groups in said polyester.

CALVIN S. FULLER.

REFERENCES CITED

The following references are of record in the file of this patent:

UNITED STATES PATENTS

| Number | Name | Date |
|---|---|---|
| 2,071,250 | Carothers | Feb. 16, 1937 |
| 2,252,271 | Mathis | Aug. 12, 1941 |
| 2,255,313 | Ellis | Sept. 9, 1941 |
| 2,308,494 | D'Alelio | Jan. 19, 1943 |
| 2,388,319 | Fuller | Nov. 6, 1945 |

FOREIGN PATENTS

| Number | Country | Date |
|---|---|---|
| 500,547 | Great Britain | Feb. 8, 1939 |

OTHER REFERENCES

Vincent, Ind. and Eng. Chem., vol. 29, pages 1267–1269, Nov. 1937.